No. 823,043. PATENTED JUNE 12, 1906.
W. J. HALPIN.
COVER FOR GRAVES.
APPLICATION FILED FEB. 17, 1906.

WITNESSES:

INVENTOR
Wm. J. Halpin,
By Franklin H. Hough
Attorney

UNITED STATES PATENT OFFICE.

WILLIAM J. HALPIN, OF DUNKIRK, INDIANA, ASSIGNOR OF ONE-HALF TO SOLAN C. ST. JOHN, OF DUNKIRK, INDIANA.

COVER FOR GRAVES.

No. 823,043.  Specification of Letters Patent.  Patented June 12, 1906.

Application filed February 17, 1906. Serial No. 301,693.

*To all whom it may concern:*

Be it known that I, WILLIAM J. HALPIN, a citizen of the United States, residing at Dunkirk, in the county of Jay and State of Indiana, have invented certain new and useful Improvements in Covers for Graves; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in covers for protecting graves, and comprises a slab, either of cement or stone, designed as a cover for the grave and provided with an integral box projecting from the upper surface of the cover utilized as a receptacle for flowers, while one end of the box projects above the marginal edge thereof and serves as a headstone to receive an inscription.

The invention consists, further, in various details of construction and arrangements of parts, which will be hereinafter fully described, and then specifically defined in the appended claim.

I illustrate my invention in the accompanying drawings, in which—

Figure 1:
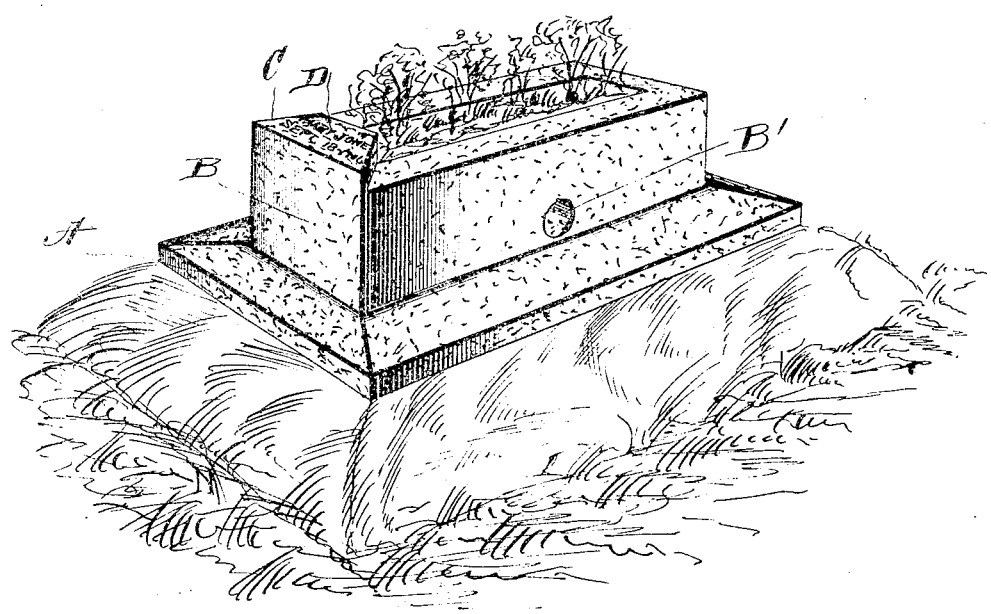
Figure 2:
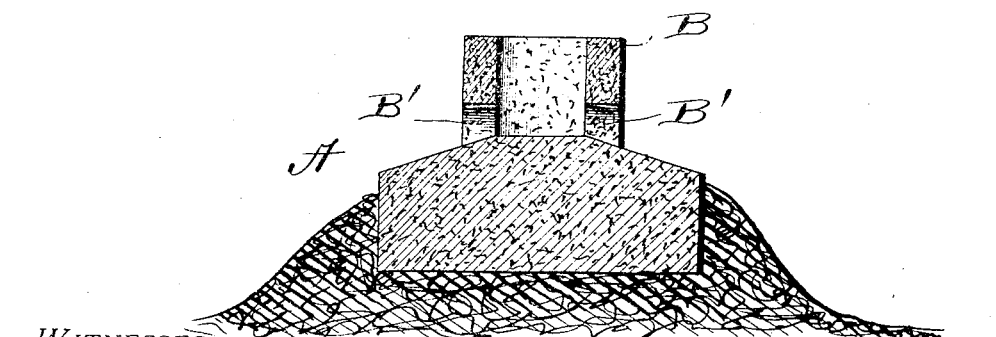

Figure 1 is a perspective view showing the application of my invention, and Fig. 2 is a cross-sectional view through the same.

Reference now being had to the details of the drawings by letter, A designates a cover, which may be of cement, stone, or other suitable material and adapted to be of such dimensions as to form a protection to the opening of a grave. The upper surface of the cover is provided with an integral box B, with openings B' in the opposite side walls thereof, the lower marginal edges of said openings being inclined, and said box is provided for the purpose of receiving earth in which plants or flowers may be set, and any excess of water which might accumulate therein is allowed to drain through the apertures B'. Downwardly-inclined water-tables project from the periphery of said box, as shown clearly in Fig. 2 of the drawings, the lower inclined marginal edge of each recess being continuous with said inclined surfaces outside of the box, whereby moisture may readily drain from the upper surface thereof. One end of said box has an integral projection C, extending above the upper marginal edge of the box, and upon the upper face thereof is a space adapted to receive an inscription D. Said surface is preferably inclined, whereby it will readily shed water, and serves as an ornamental headstone. The ends of said extension are inclined toward each other and connect the outer corners of the box with the inner corners.

From the foregoing it will be observed that by the provision of a device as shown and described a simple and efficient means is afforded for protecting a grave, while a receptacle is formed integral with the cover which may hold flowers and plants, and also by projecting one end of the box a suitable headstone is afforded, the whole forming a protection to the grave and giving an ornamental appearance.

What I claim is—

A cover for graves comprising a cement block having a box open at its top rising therefrom, with downwardly-inclining water-tables about the periphery of said box, the opposite walls of the box being apertured with their lower marginal edges continuous with the incline of said water-tables, one edge of the box being projected above the upper edges thereof and terminating in inclined ends which connect the outer and inner corners of the box, as shown and described.

In testimony whereof I hereunto affix my signature in the presence of two witnesses.

WILLIAM J. HALPIN.

Witnesses:
W. O. THORNBURG,
W. M. THOMPSON.